2,764,503
Patented Sept. 25, 1956

2,764,503

COATING FABRICS

Henning W. Jacobson, Wilmington, Del., assignor to E. I. du Pont de Nemours and Company, Wilmington, Del., a corporation of Delaware No Drawing. Application August 28, 1952, Serial No. 306,933

1 Claim. (Cl. 117—63)

This invention relates to certain cellulose derivatives and more particularly to a new class of internally modified cellulose derivatives.

Cellulose has long been a major article of commerce, primarily because of its low cost, ready availability, and the many desirable properties it possesses. For instance, cellulose of several types can be directly processed into staple fabrics and fibers of high utility in many varied fields. Examples of these types include: linen, sisal, jute, hemp and particularly cotton. The latter is used in a large portion of the low-cost textile field and is ideally suited to this use since in fabric form it exhibits good physical properties and is readily handleable with cheap and convenient aqueous processing treatments.

However, because these naturally occurring forms cannot be readily modified, these direct cellulose textiles are limited to the staple type which is not always desired. For example, in certain industrial uses, e. g. filter cloths and the like, the greater strength of continuous filament yarn makes it much preferred over staple based yarn. In some non-industrial uses the esthetic differences in hand and feel frequently make continuous filament based fabrics more desirable. Furthermore, the fabrication of such products, and, more broadly, any desired shaped object, e. g. films, flakes, sponges and the like, from not only these but also the many other available forms of cellulose would be desirable. Accordingly, several methods have been developed for modifying cellulose in its various forms to enable shaped objects other than staple-type textiles to be fabricated therefrom.

Among these methods probably the most important is the so-called viscose process wherein cellulose is converted to the xanthate which can be shaped as desired and converted in the desired form to regenerated cellulose. Other methods involve the formation of chemical derivatives of cellulose, more amenable to shaping operations which are used per se, i. e., the final regeneration step is omitted. Suitable such derivatives include the ethers and esters of cellulose, e. g. the alkoxy and cyanoethyl ethers, the oxycarbonyl esters with aliphatic carboxylic acids, and the like. However, although these methods permit the production of shaped objects of regeneration cellulose or cellulose derivatives in any desired form, the end products do not exhibit the same properties as cellulose, and are generally deficient in one or more of such important properties as: durability, launderability, organic solvent resistivity, thermal resistivity, and water sensitivity or swellability, with concomitant difficulty in conventional aqueous processing systems. Thus, industry has either had to accept, where possible, staple-based cellulose products with their desirable combination of properties or, where these could not satisfactorily be used, to accept modified cellulose or cellulose derivatives exhibiting less desirable overall properties.

This invention has as an object cellulose derivatives—ethers or esters—of outstanding water-sensitivity or swellability, high organic solvent resistance, and substantially the high thermal stability of unmodified cellulose. Another object is the provision of a process for the preparation of these new cellulose derivative products. Other objects will appear hereinafter.

These objects are accomplished by the present invention of cellulose derivatives in any shaped form having, solely internally deposited, from 0.5 to 150%, by weight of the cellulose derivative, of a vinylidene carboxamide polymer. These products are obtained by effecting the solely internal deposition in the shaped cellulose derivative, which will generally have at least one dimension small with respect to at least one other, of from 0.5% to 150%, by weight of the cellulose derivative, of a vinylidene carboxamide polymer. More specifically, it has been found that shaped objects of cellulose derivatives, in particular the ethers and esters (including both organic and inorganic acid esters) of cellulose through the hydroxyl groups of the recurring glucose units, containing from 0.5 to 150% of a wholly, internally deposited vinylidene carboxamide polymer, wherein the said polymer is preferably in major part, i. e., 50% by weight or more, composed of recurring vinylidene carboxamide monomer units in combined form, exhibit substantially the same outstanding water-sensitivity or swellability, high organic solvent resistance, and high thermal stability of unmodified cellulose.

The internal deposition of the vinylidene carboxamide polymers in the cellulose derivatives can be achieved by bringing into intimate contact, e. g. by immersion, padding, and the like, the desired form of the cellulose derivative with a solution of the requisite vinylidene carboxamide monomer in an inert solvent system therefor which is a non-solvent for the cellulose derivative, said solution containing dissolved free-radical generating addition polymerization initiator, heating the mixture to the requisite temperature to effect polymerization and finally exposing the treated shaped object to a solvent or solvents for the vinylidene carboxamide polymer which is a nonsolvent for the treated cellulose derivative until no further polymer is extracted.

The vinylidene carboxamide monomers used in the process of this invention are simply those carrying a single polymerizable, terminal, ethylenic unsaturation, i. e., a single vinylidene ($CH_2=C<$) group, one of the free valences of the said vinylidene group being singly bonded to one of the free valences of a carboxamide group

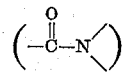

which is preferably the only carboxamide group in the molecule. In these vinylidene carboxamides the remaining valence of the vinylidene group is satisfied by hydrogen or a monovalent organic radical, which is preferably solely hydrocarbon of no more than seven carbon atoms and most preferably saturated aliphatic hydrocarbon of no more than four carbons, with the two remaining valences of the carboxamide group being satisfied by hydrogen or similar monovalent radicals, which can be together joined to form a 5- or 6-membered heterocycle, at least one of the said three valences being satisfied by hydrogen. The vinylidene carboxamides of this invention are therefore N- or C-vinylidene formamides having at least one hydrogen on an atom alpha to the carbonyl unit. Because of the greater effect produced in the thus modified cellulose derivatives at lower levels of internally deposited polymer, the more useful vinylidene carboxamide monomers are those of the above described structure wherein the said vinylidene group is directly singly linked to the acyl carbon of the single carboxamide group, i. e., the acrylamides including the α-, N-, or N,N- mono- or dihydrocarbon substituted acrylamides. Of these the acrylamides having at most one hydrogen, and that on an atom alpha to carbonyl, replaced by alkyl of up to four carbons are preferred for reasons of availability, etc., i. e., acrylamides having two hydrogens on the beta acrylyl carbon, at least one hydrogen on an atom alpha to the carbonyl, and having any valence of the acrylamide nucleus not satisfied by hydrogen satisfied by a monovalent hydrocarbon radical of up to seven carbons, preferably an alkyl group of up to four carbons.

These preferred vinylidene carboxamide monomers can also be described by the following structural formula:

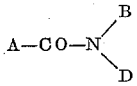

wherein one and only one, of the units A, B, and D is a vinylidene, i. e.,

group, the remaining valence of which not satisfied by the single linkage to the single carboxamide group (—CO—N<) is filled by hydrogen or a monovalent organic radical which is preferably solely hydrocarbon, including, alkyl, aryl, aralkyl, alkaryl and cycloalkyl radicals, of no more than seven carbons and most preferably by a saturated aliphatic hydrocarbon radical of no more than four carbons and the remaining two units of A, B, and D are similarly hydrogen or monovalent organic radicals which are preferably solely hydrocarbon of no more than seven carbons each and most preferably are saturated, aliphatic hydrocarbon radicals of no more than four carbons apiece, which can be together joined to form with one or both units of the carboxamide group (—CO—N<) a five- or six-membered heterocycle, at least one hydrogen being on an atom alpha to the carbonyl in the vinylidene carboxamide. A particularly preferred class are the vinylidene carboxamides of the above structure wherein A represents the single vinylidene group.

These vinylidene carboxamides have the structural formula —CO—N< wherein one and only one, of the indicated free valences is satisfied by the radical

wherein X is hydrogen or a monovalent organic radical which is preferably solely hydrocarbon, including alkyl, aryl, aralkyl, alkaryl, and cycloalkyl, of no more than seven carbons and is most preferably saturated aliphatic hydrocarbon of no more than four carbons and the remaining two free valences of the —CO—N< radical are each satisfied by X as above, alike or different, both of which can together be joined to form with one or both units of the said —CO—N< radical a five- or six-membered heterocycle, with at least one hydrogen on an atom (C or N) alpha to the carbonyl. A particularly preferred class is that of the vinylidene carboxamides of the above structure wherein the

radical is directly bonded to the acyl carbon of the carboxamide radical, i. e., compounds of the formula

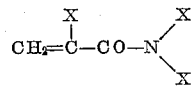

wherein the X's which can be alike or different are as defined above, at least one X being hydrogen.

The starting cellulose derivative can be pre-swollen or not. From a convenience standpoint it is desirable not to have to pre-swell the starting material, but from a viewpoint of quicker and more thorough penetration of the vinylidene carboxamide monomer, it is desirable to use a pre-swollen cellulose derivative where possible. The free radical generating addition polymerization initiators used can be any of those previously known to the art provided they are soluble in the solvents being used at the concentrations necessary for initiating polymerization. Suitable examples include: the oxygen-yielding peroxy and hydroperoxy initiators, e. g. the persulfates, benzoyl peroxide, and the like, with or without added reducing agents, i. e., the so-called redox systems, the azo-type initiators such as those described in U. S. 2,471,959, for instance, α,α'-azobis(γ-carboxy-α-methyl-butyronitrile) and the like. This latter type of initiator is preferred since the former type (the oxygen-generating systems and particularly the redox systems) effect polymerization in general at too low a temperature for maximum controllability. The temperature of polymerization can vary from 0 to 150° C. or higher, with closed systems being preferably used in the temperature ranges above about 70° C. These temperatures will vary, as is true of all addition polymerizations, depending on the particular nature of both the initiator systems and the vinylidene carboxamide monomer of monomers being used. For obvious considerations of equipment, degree of control possible and convenience, it is preferred to use those initiator systems which operate with maximum effectiveness at temperatures ranging from room temperature to 100° C. and preferably in the range 40–80° C.

Since many of the vinylidene carboxamide monomers and polymers, particularly the preferred acrylamides and especially the α-hydrocarbon substituted acrylamides, are water-soluble the monomer-treating and surface polymer removal steps in the process are usually carried out for reasons of convenience, cost, and safety in aqueous systems, the latter step being preferably at the boil. However, in some instances where the cellulose derivative is water-soluble or water-sensitive, such as is the case with many of the cellulose ethers, aqueous systems cannot be tolerated and both the monomer treating and surface polymer removal steps will have to be carried out in organic solvent systems. Similarly in other instances where the vinylidene carboxamide monomer, or more usually the polymer, or both, as in the case of methacrylanilide, are water-insoluble aqueous systems would be of no use and organic solvent systems should be used; however, water soluble monomers of water-insoluble polymers can be applied from aqueous systems.

Suitable organic solvent systems which are non-solvents for the cellulose derivative and solvents for the vinylidene carboxamide monomers and polymers may be found among: the lower aliphatic alcohols, e. g. methyl, ethyl, butyl alcohols and the like; the aromatic hydrocarbons, e. g. benzene, toluene, and the like; solutions of the cyclic hydrocarbon ethers, e. g. dioxane; and combinations thereof. In some instances varying amounts of water can be tolerated in the organic solvent systems.

The last step in the process, i. e., the solvent extraction of the treated cellulose derivative, after polymerization has been effected, with a solvent for the polymer involved, which is a non-solvent for the treated cellulose derivative, until no further polymer is extracted, is extremely important. In this step the surface polymer is removed, leaving only the internally deposited vinylidene carboxamide polymer. If this surface polymer is not all removed, appreciable and undesirable changes in the properties of the cellulose derivative are encountered, even with relatively small quantities of surface deposited polymer. For instance, in the case of cellulose acetate fibers and fabrics, at the end of the polymerization stage these materials are stiff and boardy, ranging down to oiled silk in appearance, texture and feel. Conversely, when this surface polymer is removed by exhaustive extraction, the treated cellulose acetate fibers and fabrics exhibit improved organic solvent and thermal resistivity, essentially that of cellulose, and yet have the texture and feel of the unmodified cellulose derivatives, even when containing as much as 150% (by weight of the cellulose acetate) of unextractable, wholly internally deposited vinylidene carboxamide polymer.

In this particular case, it is even more surprising that such results are obtained. For instance, while treatment of cellulose acetate fibers and fabrics with corresponding preformed vinylidene carboxamide polymers leads to products containing as high weight loadings of the polymer, these surface polymer deposits are not solvent-fast, i. e., upon treatment with a polymer solvent all the deposited polymer is removed. In contrast, the cellulose acetate materials treated by the process of the present invention, even though the particular vinylidene carboxamide polymer is readily soluble by itself in the polymer solvent used, upon continuous and exhaustive extraction still retain internal loadings of the carboxamide polymer as high as 150% by weight.

The following examples in which parts are by weight are illustrative of the invention.

Example I

A 1.403 part sample of a commercial cellulose acetate taffeta fabric (containing approximately 54.5% combined acetic acid which corresponds to a degree of acetylation of 2.38 hydroxyl unit per glucose unit) is stretched over a stainless steel frame in such a manner as to maintain the fabric flat under mild and equal tension in two dimensions, and the thus stretched fabric covered with a solution of 5 parts of acrylamide, 20 parts of methacrylamide, and 0.2 part of $\alpha,\alpha'$-azo(diisobutyramidine hydrochloride) in 225 parts of water. The solution is 10% by weight with respect to the vinylidene carboxamide monomers and the liquor to fabric weight ratio is 179:1. The fabric is allowed to stand in the monomer solution overnight (about 14–16 hours) and the whole then heated for 3 hours at 65° C. to effect polymerization. The fabric is then removed from the solution and washed thoroughly with hot water for two hours to remove all surface polymer and finally dried. There is thus obtained 1.965 parts of a cellulose acetate taffeta fabric containing 40% by weight of the original yarn (28.6% of the whole) of a solely internally deposited 80/20 methacrylamide/acrylamide copolymer.

Although the modified fabric is substantially unchanged in physical and esthetic fabric properties, quite surprisingly the fabric containing the internally deposited vinylidene carboxamide polymer is completely insoluble in acetone which readily dissolves the original cellulose acetate fabric. Furthermore, the modified fabric can be ironed dry at temperatures as high as those normally used for a cotton fabric, i. e., a "cotton" setting on a conventional household electric iron. On the other hand, the original cellulose acetate taffeta fabric when ironed under identical conditions fuses completely to a brown, plastic mass, and no longer maintains any resemblance of fabric shape.

A similar experiment carried out with a sample of a commercial cellulose acetate fabric (wherein about 2.5 hydroxyl groups per glucose unit are acetylated) and using a 79:1 liquor to fabric weight ratio resulted in the formation of a modified cellulose acetate fabric containing 16.5% by weight of the original of a wholly internally deposited 80/20 methacrylamide/acrylamide copolymer. The modified cellulose acetate fabric is likewise acetone insoluble and ironable at "cotton" temperatures in contrast to the ready solubility and fusability of control samples under these conditions. As illustrated by this experiment a decrease in the liquor to fabric weight ratio at constant monomer concentration results in an appreciable decrease in the amount of internally deposited polymer formed.

Example II

A 0.778 part skein of cellulose acetate yarn is immersed in a solution of 3.89 parts of N,N-dimethylacrylamide and 0.078 part of $\alpha,\alpha'$-azobis(isobutyramidine hydrochloride) in 35 parts of distilled water. The yarn is allowed to stand immersed in the monomer solution for one hour at room temperature and the whole then heated for three hours at 65° C. to effect polymerization. The yarn skein is then removed and washed thoroughly in hot water for two hours to remove surface polymer and finally dried. There is thus obtained 0.783 part of a modified cellulose acetate yarn containing 0.65% of wholly internally deposited poly-N,N-dimethylacrylamide. The modified yarn is substantially unchanged in break strength, elongation, resilience and other fiber properties over the unmodified cellulose acetate yarn control, but is completely insoluble in acetone as compared with the ready solubility of the unmodified control yarn therein.

Example III

A 0.778 part skein of cellulose acetate yarn is immersed in a solution of 0.78 part of methacrylamide, 0.78 part of methacrylylurea, and 0.031 part of $\alpha,\alpha'$-azobis-(isobutyramidine hydrochloride) in 29.6 parts of distilled water and treated as described previously in Example II. After washing thoroughly with hot water to remove surface polymer and drying, as before, there is thus obtained a 0.967 part skein of modified cellulose acetate yarn containing 24.3% by weight based on the original yarn of a wholly internally deposited 50/50 methacrylamide/methacrylylurea copolymer. The yarn is substantially unchanged in physical properties over the unmodified control sample, but is, however, completely insoluble in acetone and dimethylformamide in contrast to the easy solubility of the unmodified control yarn in these solvents. In addition, the dry fusion temperature of the yarn is substantially higher than that of the control.

Example IV

A 0.763 part skein of cellulose acetate yarn is immersed in a solution of 0.76 part of methacrylylurea, 0.76 part of acrylamide and 0.030 part of $\alpha,\alpha'$-azobis-(isobutyramidine hydrochloride) in 28.9 parts of water and treated as described previously in Example II. After washing thoroughly to remove surface polymer and drying, there is thus obtained a 0.860 part sample of modified cellulose acetate yarn containing 12.7% by weight based on the original yarn of a wholly internally deposited 50/50 methacrylylurea/acrylamide copolymer. The treated yarn sample is substantially unchanged in all yarn physical properties in comparison with a control sample but is completely insoluble in acetone and dimethylformamide in contrast to the easy solubility of the unmodified yarn in these solvents. In addition, the modified yarn exhibits an appreciably higher dry fusion temperature than the unmodified control.

Example V

A 0.760 part sample of cellulose acetate yarn is immersed in a solution of 0.38 part of acrylamide, 1.52 parts of N-isopropylmethacrylamide and 0.030 part of $\alpha,\alpha'$-azobis(isobutyramidine hydrochloride) in 36.1 parts of distilled water and treated as described previously in Example II. After surface polymer is removed by careful and thorough extraction with hot water and the sample dried, there is obtained a 0.811 part skein of modified cellulose acetate yarn containing 6.7% by weight of the original yarn of a wholly internally deposited 20/80 acrylamide/N-isopropylmethacrylamide copolymer. The modified yarn exhibits substantially unchanged physical properties in comparison with unmodified controls but is, however, completely insoluble in acetone and dimethylformamide in contrast to the ready solubility of the control sample in the solvent. In addition, the modified yarn exhibits an appreciably higher dry fusion temperature than unmodified controls.

Example VI

A 0.759 part skein of cellulose acetate yarn is immersed in a solution of 3 parts styrene, 1 part of methacrylamide and 0.080 part of $\alpha,\alpha'$-azodiisobutyronitrile in 36 parts of benzene. The skein is allowed to stand for one hour immersed in the monomer solution and the whole then heated at 65° C. for three hours to effect polymerization. The yarn sample is then removed from the monomer solution and any surface polymer removed by careful and thorough extraction with benzene. After drying, there is obtained a 0.806 part sample of modified cellulose acetate yarn containing 6.2% by weight of the original yarn of a wholly internally deposited 75/25 styrene/methacrylamide copolymer. The modified cellulose acetate yarn exhibits substantially unchanged physical fiber properties over unmodified controls, but is completely insoluble in acetone in contrast to the ready solubility of the unmodified yarn therein. In addition, the yarn containing the wholly internally deposited vinylidene carboxamide copolymer exhibits an appreciably higher dry fusion temperature than do unmodified controls.

Similar experiments carried out with a 50:1 bath : yarn ratio wherein the bath contains 10% styrene and 2% of the above initiator based on the styrene, and a 30:1 bath : yarn ratio wherein the bath contains 50% styrene and 0.5% of the same initiator based on the styrene resulted in the formation of modified cellulose acetate yarns containing respectively 3.3% and 19.3% wholly internally deposited polystyrene. These yarns in contrast to the modified products of this invention containing wholly internally deposited vinylidene carboxamide polymers are substantially completely soluble in acetone at room temperature.

It is to be noted that substantially the same results are achieved in like systems, or in aqueous based systems where the respective monomers are soluble, with other polymerizable vinylidene monomers capable of wholly internal deposition in polymer form in the cellulose derivatives. For instance, modified cellulose acetate yarns containing wholly internal polymer deposits of the following types of vinylidene monomers are likewise substantially completely soluble in acetone: vinylidene esters wherein the alcohol portion of the ester contains the vinylidene group, e. g. vinyl acetate, and the like; vinylidene carboxylic acids and esters thereof wherein the acid portion contains the vinylidene group, e. g. acrylic acid, methyl methacrylate, and the like; vinylidene hydrocarbons, particularly the vinylidene aryls, e. g. styrene; vinylidene ethers, e. g. allyl glycidyl ether; and the like as well as mixtures thereof, i. e., styrene/allyl glycidyl ether, styrene/methyl methacrylate, and the like.

*Example VII*

A 0.834 part skein of cellulose acetate yarn is immersed in a solution of 3.33 parts of methacrylamide, 0.84 part of acrylamide, 0.042 part of ammonium persulfate and 0.084 part of sodium bisulfite in 37.5 parts of water. Polymerization is carried out as described previously and after careful removal of all surface polymer by thorough extraction with hot water for two hours with subsequent drying, there is thus obtained a 0.902 part sample of modified cellulose acetate yarn containing 8.1% by weight of the original yarn of a wholly internally deposited 80/20 methacrylamide/acrylamide copolymer. The modified yarn exhibits substantially unchanged physical fiber properties over unmodified controls, but is completely insoluble in acetone and dimethylformamide in contrast to the ready solubility of control samples in these solvents. In addition, the modified yarn exhibits an appreciably higher dry fusion temperature than unmodified controls.

*Example VIII*

A 0.760 part skein of cellulose acetate yarn is immersed in a solution of 3.61 parts of methacrylamide, 0.19 part of acrylamide and 0.065 part of α,α′-azobis-(isobutyramidine hydrochloride) in 34.2 parts of water and polymerization carried out as described previously in Example II. After careful extraction of surface polymer with hot water over a period of two hours and finally drying, there is thus obtained a 1.289 parts sample of modified cellulose acetate yarn containing 69.7% by weight of the original yarn of a wholly internally deposited 95/5 methacrylamide/acrylamide copolymer. The modified cellulose acetate yarn is completely insoluble in acetone and dimethylformamide in contrast to the ready solubility of the unmodified yarn in these solvents.

The modified yarn exhibits either substantially unchanged or appreciably improved physical properties over controls as given below:

| | Control | The Above Modified Yarn |
|---|---|---|
| Work Recovery: | | |
| In percent from 3% elongation | 24.6 | 19.6 |
| In percent from 5% elongation | 13.7 | 12.0 |
| Total Breaking Strength in Grams: | | |
| Dry | 153 | 186 |
| Loop | 139 | 183 |
| Modulus (in grams/den. at 1%×100): Dry | 39.4 | 34.5 |
| Elongation in percent: | | |
| Dry | 23.5 | 23.9 |
| Loop | 20.9 | 21.9 |
| Moisture Regain in Percent: | | |
| At 87.5% relative humidity | 12.4 | 24.6 |
| At 97.8% relative humidity | 18.0 | 34.4 |

Similar results are obtained at higher concentrations with a higher monomer/bath ratio using the methacrylamide in slightly higher proportion. More specifically, with a 0.745 part skein of cellulose acetate yarn and a polymerization solution containing 14.45 parts of methacrylamide, 0.45 part of acrylamide and 0.30 part of α,α′-azobis-(isobutyramidine hydrochloride) in 59.6 parts of water, there is thus obtained a 1.729 parts sample of modified cellulose acetate yarn containing 132% by weight of the original yarn of a wholly internally deposited 97/3 methacrylamide/acrylamide copolymer. This modified yarn is completely insoluble in acetone and dimethylformamide, and is much more thermally resistant than controls. The physical properties of the modified yarn samples are substantially the same as those given above.

*Example IX*

A 0.752 part skein of cellulose acetate yarn is immersed in a solution of 0.75 part of methacrylamide, 3.00 parts of acrylamide and 0.075 part of α,α′-azobis(isobutyr-amidine hydrochloride) in 33.7 parts of water and polymerization carried out as described previously in Example II. After careful extraction of surface polymer with hot water over a period of two hours and finally drying, there is thus obtained a 0.779 part sample of modified cellulose acetate yarn containing 3.5% by weight of the original yarn of a wholly internally deposited 20/80 methacrylamide/acrylamide copolymer. The modified cellulose acetate yarn is completely insoluble in acetone, in contrast to the ready solubility of the unmodified yarn therein, and exhiibts a higher dry fusion temperature than the control.

The modified yarn exhibits either substantially unchanged or appreciably improved physical properties over controls as given below:

| | Control | The Above Modified Yarn |
|---|---|---|
| Work Recovery: | | |
| In percent from 3% elongation | 24.6 | 25.3 |
| In percent from 5% elongation | 13.7 | 15.1 |
| Total Breaking Strength in Grams: | | |
| Dry | 153 | 151 |
| Loop | 139 | 138 |
| Modulus in Grams/den. at 1%×100: Dry | 39.4 | 40.0 |
| Elongation in percent: | | |
| Dry | 23.5 | 21.4 |
| Loop | 20.9 | 17.3 |
| Moisture Regain: | | |
| At 87.5% relative humidity | 12.4 | 13.3 |
| At 97.8% relative humidity | 18.0 | 19.7 |

Example X

A cellulose acetate satin fabric is padded with a solution of 4.5 parts of acrylamide, 18 parts of methacrylamide and 0.2 part of α,α'-azobis(isobutyramidine hydrochloride) in 77.3 parts of water. The padded fabric is then passed three times for five minutes each pass through a rapid ager in an oxygen-free steam atmosphere at about 230° F. to effect polymerization. The treated fabric is then dried and boiled for ten minutes in water to remove surface polymer and finally dried again. There is thus obtained a modified cellulose acetate satin containing 12.2% of a wholly internally deposited 80/20 methacrylamide/acrylamide copolymer. Similar experiments using 25% by weight aqueous solutions of methacrylamide result in modified cellulose acetate satin fabrics containing from 9.5 to 18% wholly internally deposited polymethacrylamide.

The treated fabrics all exhibit much higher dry fusion temperatures than untreated controls. As determined on the Suter tester these increases range from 10 to 30° C. over the fusion temperature (220–230° C.) of the unmodified controls. The modified fabrics containing the wholly internally deposited acrylamide polymers exhibit greatly improved dye uptakes with both acid and direct dyes, in contrast to the very poor affinities of controls for these types of dyes, and at the same time exhibit substantially as good dyeability with most acetate dyes as do the unmodified controls.

These modified cellulose acetate fabrics containing the wholly internally deposited vinylidene carboxamide polymers also exhibit improved gas fume fastness on dyeing. For instance, when the above fabric containing the wholly internally deposited 18% polymethacrylamide is dyed with a blue acetate dye whose foreign prototype is Pr. 228, the gas fume fastness of the dyed fabric is comparable with that imparted when good commercial anti-fume agents are used. This gas fume fastness effect is fast to both washing and dry-cleaning. It is to be noted that the same result is obtained when the cellulose acetate satin fabric is first dyed and then treated so as to cause the internal deposition of the vinylidene carboxamide polymer.

Example XI

A 1.824 parts sample of a cyanoethylcellulose yarn (containing 0.2 cyanoethyl groups per glucose unit on a molar basis) is immersed in a solution of 0.92 part of acrylamide, 8.15 parts of methacrylamide, and 0.181 part of α,α'-azobis-(isobutyramide hydrochloride) in 81.6 parts of distilled water and treated as described previously in Example II. After surface polymer is removed by careful and thorough extraction with water (one hour in running hot water, two hours in boiling water and one further hour in fresh water at 85° C.) and the sample dried, there is obtained a 2.421 part skein of modified cyanoethylcellulose yarn (0.2 cyanoethyl groups per glucose unit on a molar basis) containing 32.8% by weight of the original yarn of a wholly internally deposited 10.1/89.9 acrylamide/methacrylamide copolymer. The modified yarn exhibits substantially unchanged physical properties in comparison with unmodified controls, but is however not soluble in 2% aqueous sodium hydroxide solution in contrast to the ready and rapid solubility of the control sample in the same solvent.

The process of this invention is generically applicable to cellulose derivatives and the invention is generic to cellulose derivatives containing appreciable quantities of wholly internally deposited vinylidene carboxamide polymers. Generically the cellulose derivatives within which the vinylidene carboxamide polymers are deposited to prepare the products of this invention are classified as modified celluloses in which from 0.1 to all of the three hydroxyl groups in each recurring glucose unit in the cellulose structure have been etherified or esterified, i. e., wherein from 0.1–3.0 of the hydroxyl groups in each recurring glucose unit in the cellulose structure have been replaced by the negative radical remaining after removal of the acidic hydrogen from an alcohol or acid, including both organic and inorganic acids, e. g., methyl cellulose, cyanoethyl cellulose, cellulose acetate, cellulose nitrate, and the like. A preferred group of the cellulose derivatives within which vinylidene carboxamide polymers can be solely internally deposited to prepare the new products of the present invention include those cellulose derivatives wherein from 1.0–2.5 of the hydroxyl groups of each recurring glucose unit in the cellulose structure have been replaced by etheroxy (—OR) and carbacyloxy (—OCOR) groups in which the radicals linked to the cellulose chain through the said etheroxy and acyloxy links are monovalent organic radicals free of Zerewitinoff active hydrogen which most preferably are solely saturated aliphatic hydrocarbon.

The above examples have illustrated a preferred mode of operation of the invention, i. e., its application to cellulose acetate. This cellulose derivative is widely used in the textile industry but its disadvantages and difficulties, e. g. in low ironing temperature, difficulty of dyeing, ease of fume fading, etc. have worked against a wider acceptance and utilization. The invention has therefore been intensively illustrated in its application to cellulose acetate in film fiber or fabric form. The invention is however applicable to cellulose derivatives in general, including cellulose ethers, e. g. cyanoethyl cellulose, carboxymethylcellulose, and particularly the solely hydrocarbon cellulose ethers, e. g. methyl-, ethyl-, propylcellulose as well as the mixed ethers, e. g. methylethylcellulose; the cellulose esters, particularly those with the monocarboxylic acids of no more than four carbons, e. g. cellulose propionate, cellulose butyrate as well as the mixed esters, e. g. cellulose acetate/propionate, cellulose acetate/butyrate, and the like, as well as the cellulose esters of inorganic acids, e. g. cellulose nitrate, and the like.

As stated previously this invention is generic to the internal deposition wholly within cellulose derivatives of from as little as 0.5% to as much as 150% by weight of vinylidene carboxamide addition polymers. For reasons of better overall properties and lower cost those products containing 2.5 to 75% of the wholly internal vinylidene carboxamide polymers are preferred. Particularly outstanding because of the greater overall desirable property changes exhibited thereby are the products containing 5–50% wholly internal vinylidene carboxamide polymer. In the generic sense these polymers contain in combined form a plurality of recurring vinylidene carboxamide groups by which is meant those monomers containing a single vinylidene ($CH_2=C<$) group per molecule singly bonded through one of the free valences to one of the free valences of a carboxamide (—CO—N<) group. Suitable examples of such polymers include those of the vinylidene carboxamides wherein the single vinylidene group is bonded to the acyl carbon of the carboxamide group with the remaining two free valences of the said carboxamide group satisfied by hydrogen or hydrocarbon radicals of no more than 7 carbons each, which may together be joined to form with the nitrogen of the carboxamide a heterocycle, and the remaining free valence of the vinylidene group is satisfied by hydrogen or similar hydrocarbon radicals which may be alkyl, aryl, aralkyl, alkaryl, or cycloalkyl in nature, provided at least one of the said three valences is satisfied by hydrogen. The vinylidene carboxamides of the present invention are thus vinylidene formamides, the vinylidene being on carbon or nitrogen and having a hydrogen on an atom alpha to the carbonyl. The invention can thus be practiced using, as the vinylidene carboxamide, acrylamide, N-ethylmethacrylamide, N-propylethacrylamide, 1-acrylylpiperidine, 4-acrylylmorpholine, N-phenylacrylamide (acrylanilide), N-α-dibenzylacrylamide, N-cyclohexylmethacrylamide, and the like.

The process of the present invention can also be practiced using as the vinylidene carboxamide those wherein the single vinylidene group is directly singly bonded to the amide nitrogen of the carboxamide radical and the remaining two valences of the carboxamide, —CO—N<, group are satisfied by hydrogen or hydrocarbon, e. g. alkyl, aryl, aralkyl, alkaryl, or cycloalkyl radicals, which hydrocarbon radicals may be joined together to form with the carboxamide radical a heterocycle, and the remaining free valence on the 1-carbon of the vinylidene group is similarly satisfied by hydrogen or like hydrocarbon radicals, provided at least one of the said three valences is satisfied by hydrogen. Suitable specific examples of this class of vinylidene carboxamides include N-vinylformamide, N-vinyl-N-methylacetamide, N-vinylbenzamide, N-methyl-N-vinyl-formamide, N-vinylcyclohexanecarboxamide, N-vinyl-C-phenylacetamide, and the like.

Because of their readier availablity and greater handleability in the process of this invention, the vinylidene carboxamides wherein the single vinylidene group is directly singly bonded to the acyl carbon of the carboxamide radical are preferred. A particularly outstanding class of these preferred vinylidene carboxamides, i. e., the acrylamides, are those wherein the 1-carbon of the vinylidene group, i. e., the one directly linked to the acyl carbon, and the carboxamide nitrogen carry hydrogen or lower hydrocarbon radicals free of aliphatic unsaturation and generally of less than 6 carbons each with the two radicals directly bonded to the carboxamide nitrogen forming if desired with the said nitrogen a heterocycle, there being at least one hydrogen on an atom, carbon or nitrogen, alpha to the carboxamide carbonyl. The most preferred acrylamides are those wherein the substituents on the alpha-carbon and the amide nitrogen, at least one of which must be hydrogen, are hydrogen or solely saturated aliphatic hydrocarbon radicals of no more than three carbons apiece, with the total number of carbons in all three such substituents per molecule not exceeding six carbons since such polymers lead to greater hydrophilicity in the modified products.

In the foregoing the internally deposited polymers have been generically referred to as vinylidene carboxamides. This invention includes in its broader aspects shaped objects of cellulose derivatives having wholly internal deposits not only of vinylidene carboxamide homopolymers but also vinylidene carboxamide polymers containing in combined form other polymerizable ethylenically unsaturated monomers than the vinylidene carboxamide type in amounts as high as 90% of the polymers. Preferably, the internally deposited polymers predominate in, i. e., contain, in combined form, at least 50% of vinylidene carboxamide monomer units since such polymers result in modified products of better overall properties. Because of the more desirable properties conferred on the thus treated shaped cellulose derivatives, e. g., because of their greater thermal resistivity, higher organic solvent insensitivity, and greater water-swellability, the preferred compositions of the present invention contain internally deposited vinylidene carboxamide polymers wherein at least 75% and more preferably at least 80% of the recurring units in the polymer are combined vinylidene carboxamide units.

The other polymerizable monomers which can be used in preparing the products of this invention, i. e., which are present in combined form in the internally deposited predominantly vinylidene carboxamide polymers, include generically the polymerizable ethylenically unsaturated monomers, e. g. the mono- and diene monomers, by now well known in the polymerization art, such as ethylene, butadiene and the hydrocarbon and negatively substituted derivatives thereof, e. g. styrene, chloroprene, acrylic acid and the like. Preferred among these ethylenically unsaturated polymerizable monomers are those containing a single ethylenic group, and that terminal, i. e., the vinylidene monomers containing a single group ($CH_2=C<$). Particularly preferred are those vinylidene monomers wherein at least one of the indicated free valences is bonded directly to a negative group, e. g. the vinylidene halides, e. g. vinylidene chloride, vinyl chloride; the vinylidene esters, e. g. vinyl acetate, vinyl propionate, and the like; the esters of terminal methylenic acids, e. g. methyl acrylate, glyceryl methacrylate, and the like.

The products of this invention, i. e., cellulose derivatives containing at least 0.5% solely, internally deposited vinylidene carboxamide polymer exhibit not only appreciably improved moisture regain values, organic solvent insensitivity, and greater thermal resistivity than control cellulose derivatives containing no internally deposited polymer, but also lose their absorbed water at a much lower rate on air-drying (a property of high importance in many mill operations) and furthermore, are dyeable with typical commercial dyes, including in particular acid dyes to which the cellulose derivatives containing no internally deposited vinylidene carboxamide polymer are notably resistant. The products of this invention are thus completely different from control samples of the cellulose derivatives containing no internal vinylidene carboxamide polymer.

Thus cellulose acetate, for instance, the conventional commercial cellulose derivative in which about 2.5 of the hydroxyl groups in each glucose unit in the cellulose are acetylated, is readily soluble in acetone, from which solvent it is normally processed in film- and fiber-form and is quite thermally sensitive as evidenced by the relatively low maximum ironing temperature, of about 285° F., permitted with cellulose acetate fabrics. In contrast cellulose acetate in any form containing as little as 0.5% and preferably at least 2.5% wholly internally deposited vinylidene carboxamide polymer, for instance, an 80/20 methacrylamide/acrylamide copolymer, is no longer soluble in acetone. Furthermore, similar fabrics containing as little as 2.5% and preferably at least 5% of a wholly internally deposited vinylidene carboxamide polymer can be readily and easily ironed dry at cotton temperatures on the standard household iron scale (about 330–370° F.), i. e., at temperatures about 45–85° F. above the maximum possible ironing temperature for cellulose acetate fabrics containing no internal carboxamide polymer.

Such extreme property changes attained with so little wholly internally deposited vinylidene carboxamide polymer are particularly surprising, especially since these results are achieved by treating the cellulose derivatives with a vinylidene monomer under conditions so as to effect polymerization and do not lead to any undesirable esthetic properties such as in hand drape or feel. Hitherto the treatment of cellulose materials with vinylidene monomers and polymers has resulted in appreciable changes in the desirable overall characteristics of the materials, e. g. the increase in stiffness and water-resistivity of cellulose and cellulose derivatives obtained by treatment with vinylidene monomers or polymers—see U. S. 2,406,453.

The foregoing detailed description has been given for clearness of understanding only and no unnecessary limitations are to be understood therefrom. The invention is not limited to the exact details shown and described for obvious modifications will occur to those skilled in the art.

What is claimed is:

The process wherein cellulose acetate taffeta fabric of approximately 54.5% combined acetic acid content is impregnated with an aqueous solution of 5 parts acrylamide, 20 parts methacrylamide and 0.2 part α,α'-azodiisobutyramidine hydrochloride in 225 parts of water, the monomers are copolymerized in situ, and surface copolymer is removed by thorough washing with hot water whereby a cellulose acetate taffeta fabric insoluble in acetone, ironable at cotton temperatures, and having a wholly internal deposit of an acrylamide/methacrylamide copolymer is obtained.

References Cited in the file of this patent

UNITED STATES PATENTS

| | | |
|---|---|---|
| 2,089,925 | Neiley | Aug. 10, 1937 |
| 2,097,417 | Neiley | Oct. 26, 1937 |
| 2,118,036 | Booty et al. | May 24, 1938 |
| 2,314,968 | Bestian et al. | Mar. 30, 1943 |
| 2,343,095 | Smith | Feb. 29, 1944 |
| 2,406,454 | Charlton | Aug. 27, 1946 |
| 2,415,564 | Radford et al. | Feb. 11, 1947 |

FOREIGN PATENTS

| | | |
|---|---|---|
| 475,671 | Great Britain | June 2, 1937 |

OTHER REFERENCES

J. Society Dyers and Colorists, vol. 67, pp. 338–344, 1951.